(12) United States Patent
Posthuma et al.

(10) Patent No.: US 12,454,699 B2
(45) Date of Patent: Oct. 28, 2025

(54) DOWNY MILDEW RESISTANT MELON PLANTS

(71) Applicant: Enza Zaden Beheer B.V., Enkhuizen (NL)

(72) Inventors: Karin Ingeborg Posthuma, Enkhuizen (NL); Laura Naranjo Peña, Enkhuizen (NL); Simon Aigner, Enkhuizen (NL); Wilhelmina Antonia Cornelia Anna Leijten, Enkhuizen (NL); Christianus Cornelis Nicolaas Van Schie, Amsterdam (NL)

(73) Assignee: Enza Zaden Beheer B.V., Enkhuizen (NL)

( * ) Notice: Subject to any disclaimer, the term of this patent is extended or adjusted under 35 U.S.C. 154(b) by 613 days.

(21) Appl. No.: 17/614,117

(22) PCT Filed: May 24, 2019

(86) PCT No.: PCT/EP2019/063454
§ 371 (c)(1),
(2) Date: Nov. 24, 2021

(87) PCT Pub. No.: WO2020/239186
PCT Pub. Date: Dec. 3, 2020

(65) Prior Publication Data
US 2022/0228163 A1 Jul. 21, 2022

(51) Int. Cl.
C12N 15/82 (2006.01)
A01H 1/00 (2006.01)
A01H 6/34 (2018.01)
C12N 9/12 (2006.01)

(52) U.S. Cl.
CPC ....... *C12N 15/8282* (2013.01); *A01H 1/1255* (2021.01); *A01H 6/344* (2018.05); *C12N 9/1205* (2013.01); *C12Y 207/01039* (2013.01)

(58) Field of Classification Search
None
See application file for complete search history.

(56) References Cited

U.S. PATENT DOCUMENTS

| 8,237,019 | B2 | 8/2012 | Van Den Ackerveken et al. |
| 8,354,570 | B2 | 1/2013 | Van Den Ackerveken et al. |
| 8,569,064 | B2 | 10/2013 | Spangenberg et al. |
| 8,575,432 | B2 * | 11/2013 | Van Den Ackerveken et al. ........ C12N 15/8282 800/301 |
| 8,796,511 | B2 | 8/2014 | Van Den Ackerveken et al. |

FOREIGN PATENT DOCUMENTS

| EP | 0028011 B1 | 11/1986 |
| EP | 1957655 B1 | 8/2016 |
| WO | WO-2000070016 A2 | 11/2000 |
| WO | WO-2002088301 A2 | 11/2002 |
| WO | WO-2005124108 A2 | 12/2005 |
| WO | WO-2007051483 A1 | 5/2007 |
| WO | WO-2007051626 A2 | 5/2007 |
| WO | WO-2008092505 A1 | 8/2008 |
| WO | WO-2012116938 A1 | 9/2012 |
| WO | WO-2019154520 A1 | 8/2019 |

OTHER PUBLICATIONS

Perchepied et al. Relationship between loci conferring downy mildew and powdery mildew resistance in melon assessed by quantitative trait loci mapping. (2005) Phytophathology; vol. 95; pp. 556-565 (Year: 2005).*
Van Damme et al., Downy Mildew Resistance in *Arabidopsis* by Mutation of Homoserine Kinase, 2009, The Plant Cell, vol. 21, pp. 2179-2189. (Year: 2009).*
Porterfield et al., Candidate Susceptibility Genes for Powdery and Downy Mildew in Watermelon and Squash, 2017, Journal of Phylogenetics & Evolutionary Biology, vol. 5(2), pp. 1-15. (Year: 2017).*
Huibers et al., Powdery Mildew Resistance in Tomato by Impairment of SlPMR4 and SlDMR1, 2013, PLoS One, vol. 8(6), pp. 1-8. (Year: 2012).*
Lehtovaara et al., A new method for random mutagenesis of complete genes:enzymatic generation of mutant libraries in vitro, 1988, Protein Engineering, vol. 2(1), pp. 63-68. (Year: 1988).*
McCallum et al., Targeting Induced Local Lesions IN Genomes (TILLING) for Plant Functional Genomics, 2000, Plant Physiology, vol. 123, pp. 439-442. (Year: 2000).*
Brown et al., Fitness costs and trade-offs of disease resistance and their consequences for breeding arable crops, 2013, Plant Pathology, vol. 62(1), pp. 83-95 (Year: 2013).*
Adjustments on the Agilent UHPLC instructions of use for L-homoserine measurements, submitted in opposition proceedings for EP1957655 on Jan. 8, 2018, 2 pages.
Agilent ZORBAX Eclipse AAA Instructions for Use, general protocol for measuring homoserine submitted in opposition procedure for EP1957655 on Jan. 8, 2018, 2 pages.
Aubert et al., (1998). "Transport, Compartmentation, and Metabolism of Homoserine in Higher Plant Cells", Plant Physiol., 116:547-557.

(Continued)

*Primary Examiner* — Bratislav Stankovic
*Assistant Examiner* — Christina L Meadows
(74) *Attorney, Agent, or Firm* — Foley Hoag LLP; Brendan T. Jones; David E. Shore

(57) ABSTRACT

The present disclosure relates to melon plants that are resistant to the plant disease downy mildew caused by the pathogen *Pseudoperonospora cubensis*. Specifically, the present disclosure relates to melon plants that are resistant to downy mildew disease including a mutated homoserine kinase gene encoding a mutated homoserine kinase protein. The present disclosure further relates to seeds, tissues, cells, or plant parts of the present melon plants, and to methods for identifying downy mildew resistant melon plants.

20 Claims, 6 Drawing Sheets
Specification includes a Sequence Listing.

(56) References Cited

OTHER PUBLICATIONS

Azevedo et al., (1997). "The Biosynthesis and Metabolism of the Aspartate Derived Amino Acids in Higher Plants," Photochemistry, 46(3):395-419.
Brewer et al., (2014). "Mutations in the Arabidopsis homoserine kinase gene DMR1 confer enhanced resistance to Fusarium culmorum and F. graminearum," BMC Plant Biology, 14(1):317, 15 pages.
Certified priority document, International Patent Application No. PCT/EP2005/011718 submitted in opposition proceedings for EP1957655 on May 24, 2017, 38 pages.
Commission Notice on certain articles of Directive 98/44/EC of the European Parliament and of the Council on the legal protection of biotechnological inventions. 2016. Official Journal of the European Union C-411/3-14, filed during opposition of EP1957655, 12 pages.
Constantinescu et al., (2002), "Peronospora-like Fungi (Chromista, Peronosporales) Parasitic on Brassicaceae and Related Hosts", Nova-Hedwigia, 74:291-338.
Dai et al., (1995). "Involvement of phenolic compounds in the resistance of grapevine callus to downy mildew (*Plasmopara viticola*)," European Journal of Plant Pathology, 101:541-547.
Declaration of Dr. ir. Karin Ingeborg Posthuma submitted in opposition proceedings for EP1957655 dated Oct. 31, 2013, 3 pages.
Declaration of Mathieu Pel, PhD in charge of carrying out the experiments reported in D41 and D45A-C dated Jan. 4, 2018, 1 page.
Develey-Riviere et al., (2007). "Resistance to pathogens and host developmental stage: a multifaceted relationship within the plant kingdom," New Phytologist, 175:405-416.
Enza experimental data on mutation in Lettuce DMR1 submitted in opposition proceedings for EP1957655 on Jan. 8, 2018, 3 pages.
Enza experimental data on mutation in Melon DMR1 submitted in opposition proceedings for EP1957655 on Jan. 8, 2018, 3 pages.
Enza experimental data on mutation in Onion DMR1 submitted in opposition proceedings for EP1957655 on Jan. 8, 2018, 3 pages.
Experimental Evidence with Annexes submitted by Nunhems B.V in opposition proceedings for EP1957655 on Oct. 11, 2018, 10 pages.
Flanagan et al., (2010). "Using SIFT and PolyPhen to predict loss-of-function and gain-of-function mutations", Genetic Testing and Molecular Biomarkers, 14(4):533-537.
Garcia-Mas et al., (2012). "The genome of melon (*Cucumis melo* L.)", Proceedings of the National Academy of Sciences, 109(29):11872-11877.
GenBank, (2000). "*Arabidopsis thaliana* homoserine kinase (HSK) mRNA, complete cds; Accession No. AF082525," retrieved online from <https://www.ncbi.nlm.nih.gov/nuccore/AF082525>, 2 pages.
Göker et al., (2003). "Taxonomic aspects of Peronosporaceae inferred from Bayesian molecular phylogenetics", Canadian Journal of Botany, 81(7):672-683.
Göker et al., (2004). "Phylogeny of Hyaloperonospora based on nuclear ribosomal internal transcribed spacer sequences", Mycological Progress, 3(2):83-94.
Hong et al., (2008). "First confirmed report of downy mildew caused by Hyaloperonospora parasitica on broccoli in Korea", Plant Pathology, 57(4):777.
HSK amino acid sequence submitted in opposition proceedings for EP1957655 on May 22, 2017, 4 pages.
Huibers et al., (2013). "Powdery Mildew Resistance in Tomato by Impairment of SlPMR4 and SlDMR1," PLoS One, 8(6):e67467, 8 pages.
Interlocutory decision for European Patent Application No. 12155885.2 submitted in opposition proceedings for EP1957655 on Oct. 11, 2018, 15 pages.
Jefrey, (1980). "A review of the Cucurbitaceae," Botanical Journal of the Linnean Society, 81:233-247.
Lamour et al., (2009). "Oomycete Genetics and Genomics: Diversity, Interactions and Research Tools", Wiley-Blackwell, 6 pages.
Lee et al., (1999). "Identification of the Gene Encoding Homoserine Kinase from *Arabidopsis thaliana* and Characterization of the Recombinant Enzyme derived from the Gene", Arch. Biochem. Biophys., 372(1):135-142.
Lee et al., (2005). "Methionine and Threonine Synthesis are Limited by Homoserine availability and not the Activity of Homoserine Kinase in *Arabidopsis thaliana*", The Plant Journal, 41:685-696.
Maimann et al., (2000). "Transgenic potato plants reveal the indespensable role of cystathionine beta-lyase in plant growth and development," The Plant Journal, 23(6):747-758.
Menda et al., (2004). "In silico screening of a saturated mutation library of tomato," The Plant Journal 38:861-872.
Multiple alignment of DMR1 from *Arabidopsis*, onion, melon and lettuce submitted in opposition proceedings for EP1957655 on Jan. 8, 2018, 1 page.
Pacific Pests and Pathogens Fact Sheet on cabbage downy mildew, dated Sep. 20, 2017, 3 pages.
Perchepied et al., (2005). "Relationship Between Loci Conferring Downy Mildew and Powdery Mildew Resistance in Melon Assessed by Quantitative Trait Loci Mapping," Phytopathology, 95(5):556-565.
Rijk Zwaan report on HSK mutants In Cucumber submitted in opposition proceedings for EP1957655 on May 22, 2017, 1 page.
Rijk Zwaan report on HSK mutants in Spinach submitted in opposition proceedings for EP1957655 on May 22, 2017, 1 page.
Schlegel, (2003). "Encyclopedic dictionary of plant breeding and related subjects," 2003, pp. 235-236.
Sedlarova et al., (2001). "Histochemical Detection and Role of Phenolic Compounds in the Defense Response of *Lactuca* spp. to Lettuce Downy Mildew (*Bremia lactucae*)." J. Phytopathology, 149:693-697.
Silencing of homoserine kinase (DMR1) in lettuce variety Pinokkio experimental data submitted in opposition proceedings for EP1957655 on Jan. 8, 2018, 2 pages.
Sim et al., (2012). "SIFT web server: predicting effects of amino acid substitutions on proteins". Nucleic Acids Res., 40, Web Server issue, 6 pages.
Smart et al., "Best Control of Downy Mildew in Cole Crops", Dept. of Plant Pathology and Plant-Microbe Biology, Cornell University, Geneva NY, submitted in opposition proceedings for EP1957655 on Jan. 8, 2018, 2 pages.
Smart et al., (2002). "Identification of quantitative resistance in Lycopersicon pennellii to Phytophthora infestans," Phytopathology 92:S77.
Stuttmann et al., (2011). "Perturbation of *Arabidopsis* Amino Acid Metabolism Causes Incompatibility with the Adapted Biotrophic Pathogen Hyaloperonospora arabidopsidis," The Plant Cell, 23:2788-2803.
Sun et al., (2016). "Silencing of Six Susceptibility Genes Results in Potato Late Blight Resistance", Transgenic Research, 25: 731-742.
Thines et al., (2009). "Chapter 3.4: Taxonomy and phylogeny of the downy mildews (*Peronosporaceae*)," Oomycete Genetics and Genomics: Diversity, Interactions and Research Tools, pp. 52-55, 6 pages.
Thukral et al., (1986). "Biochemical genetic basis of downy mildew resistance in pearl millet," Theor Appl Genet, 71:648-651.
UniProt, XP002795728, retrieved from EBI accession No. UNIPROT:A0A1S3BR18 Database accession No. A0A1S3BR18 on Nov. 19, 2010, 4 pages.
Van Damme et al., (2005). "Identification of *Arabidopsis* Loci Required for Susceptibility to the Downy Mildew Pathogen Hyaloperonospora parasitica", Molecular Plant-Microbe Interactions, 18(6):583-592.
Van Damme et al., (2009). "Downy Mildew Resistance in *Arabidopsis* by Mutation of Homoserine Kinase," The Plant Cell Online, 21(7):2179-2189.
Van Damme, Mireille, (2007). "Genetic analysis of disease susceptibility in the *Arabidopsis-hyaloperonospora* parasitica interaction," Thesis, 134 pages.
Voglmayr, Hermann, (2003). "Phylogenetic relationships of Peronospora and related genera based on nuclear ribosomal ITS sequences", Mycol. Res., 107(10):1132-1142.
Wikipedia, "Enzyme Assay", submitted on May 22, 2017, available online at <https://en.wikipedia.org/wiki/Enzyme_assay>, filed during opposition of EP1957655, 6 pages.

(56) References Cited

OTHER PUBLICATIONS

Wikipedia, "Hyaloperonospora Brassicae", website as of Sep. 20, 2017, available online at <https://en.wikipedia.org/wiki/Hyaloperonospora_brassicae>, filed during opposition of EP1957655, 2 pages.

Wikipedia, "Hyaloperonospora Parasitica", website as of Sep. 20, 2017, available online at <https://en.wikipedia.org/wiki/Hyaloperonospora_parasitica>, filed during opposition of EP1957655, 3 pages.

Zeilmaker, Tieme, (2012). Functional and Applied Aspects of the Downy Mildew Resistant 1 and 6 Genes in *Arabidopsis*, Universiteit Utrecht, Available at <http://web.science.uu.nl/pmi/publications/PDF/2012/Proefschrift-Zeilmaker-2012.pdf>, 147 pages.

Zhang et al., (2009). "Three Combined Quantitative Trait Loci from Nonhost Lactuca saligna Are Sufficient to Provide Complete Resistance of Lettuce Against Bremia lactucae," MPMI, 22(9):1160-1168.

Geneseq, (Oct. 18, 2000). *Arabidopsis thaliana* protein fragment SEQ ID No. 56649; Accession No. AAG451451, 4 pages.

\* cited by examiner

FIG. 3

>protein sequence homoserine kinase (SEQ ID No. 1)
MAMISYQPPLKSLTIPPVSLSNPKPVLFRCSLSLPSRAAVTSVEPQPVFS
SVKAFAPATVANLGPGFDFLGCAVDGLGDYVSLSVDSNVHPGEVAISDIT
GNNTNKLSKNPLYNCAGIAAIEVMKMLGIRSVGLSLSLEKGLPLGSGLGS
SAASAAAAIAVNGLFGGKLGVEELVLAGLKSEEKVSGYHADNVAPAIMG
GFILIRNYEPLELIRLKFPVDKELFFVLVSPEFEAPTKKMRAALPAEVGM
PHHVWNSSQAGALVAAVLQGDTMGLGKALSSDKIVEPRRSPLIPGMDGVK
KAAIAAGAFGCTISGAGPTAVAVIDNEEQGKEIGERMVMAFLKEGNLKAA
ASVKRLDRVGARLIGSTPLDRVL*

>coding sequence homoserine kinase (SEQ ID No. 2)
ATGGCTATGATCTCCTATCAACCGCCATTGAAGTCGTTGACCATTCCTCC
AGTTTCTTTATCTAACCCTAAACCTGTTCTCTTCAGGTGCAGTTTGTCTC
TTCCATCTAGAGCCGCCGTCACCTCGGTCGAACCTCAACCGGTTTTCTCC
TCCGTCAAGGCCTTTGCTCCTGCAACCGTCGCTAATTTAGGCCCCGGCTT
TGATTTCCTTGGCTGCGCTGTTGATGGCTTGGGAGATTATGTCTCTCTTA
GTGTTGATTCCAATGTTCATCCAGGTGAAGTTGCGATTTCTGATATTACA
GGGAACAACACGAATAAACTTAGTAAAAATCCTCTCTATAATTGTGCTGG
TATTGCTGCTATTGAGGTTATGAAAATGCTAGGGATTCGATCTGTTGGTC
TTTCTCTTTCGCTTGAGAAAGGTTTGCCGTTAGGGAGTGGATTGGGATCT
AGTGCTGCGAGTGCAGCTGCTGCTGCGATTGCTGTTAATGGATTGTTCGG
TGGGAAATTAGGAGTAGAGGAATTGGTTCTCGCGGGGTTGAAATCGGAAG
AGAAGGTTTCTGGATATCATGCGGATAATGTCGCACCGGCTATCATGGGG
GGTTTCATTCTGATTCGAAATTACGAACCCTTGGAATTGATTCGTTTGAA
ATTCCCCGTCGATAAGGAGCTGTTCTTCGTGTTGGTCAGCCCGGAATTCG
AAGCACCGACGAAGAAAATGCGGGCTGCGTTACCTGCTGAAGTTGGGATG
CCACACCATGTGTGGAATTCCAGCCAAGCCGGGGCGTTGGTGGCCGCGGT
GCTGCAGGGCGACACGATGGGATTGGGGAAAGCATTGTCCTCAGACAAAA
TTGTGGAGCCAAGGCGTTCCCCATTAATTCCAGGTATGGATGGTGTTAAG
AAGGCAGCCATTGCTGCTGGGGCATTTGGGTGCACGATAAGTGGAGCAGG
GCCAACGGCGGTGGCAGTGATCGATAACGAAGAGCAGGGGAAGGAGATTG
GTGAGAGGATGGTTATGGCGTTTCTGAAGGAAGGAAATTTGAAAGCTGCG
GCATCTGTAAAGAGACTAGATCGAGTTGGTGCAAGGCTTATTGGATCAAC
TCCTTTAGATAGAGTTTTATGA

FIG. 4

>protein sequence homoserine kinase comprising the A349T mutation (SEQ ID No. 3)
MAMISYQPPLKSLTIPPVSLSNPKPVLFRCSLSLPSRAAVTSVEPQPVFS
SVKAFAPATVANLGPGFDFLGCAVDGLGDYVSLSVDSNVHPGEVAISDIT
GNNTNKLSKNPLYNCAGIAAIEVMKMLGIRSVGLSLSLEKGLPLGSGLGS
SAASAAAAAIAVNGLFGGKLGVEELVLAGLKSEEKVSGYHADNVAPAIMG
GFILIRNYEPLELIRLKFPVDKELFFVLVSPEFEAPTKKMRAALPAEVGM
PHHVWNSSQAGALVAAVLQGDTMGLGKALSSDKIVEPRRSPLIPGMDGVK
KAAIAAGAFGCTISGAGPTAVAVIDNEEQGKEIGERMVMAFLKEGNLKTA
ASVKRLDRVGARLIGSTPLDRVL*

>coding sequence homoserine kinase comprising the G1045A mutation (SEQ ID No. 4)
ATGGCTATGATCTCCTATCAACCGCCATTGAAGTCGTTGACCATTCCTCC
AGTTTCTTTATCTAACCCTAAACCTGTTCTCTTCAGGTGCAGTTTGTCTC
TTCCATCTAGAGCCGCCGTCACCTCGGTCGAACCTCAACCGGTTTTCTCC
TCCGTCAAGGCCTTTGCTCCTGCAACCGTCGCTAATTTAGGCCCCGGCTT
TGATTTCCTTGGCTGCGCTGTTGATGGCTTGGGAGATTATGTCTCTCTTA
GTGTTGATTCCAATGTTCATCCAGGTGAAGTTGCGATTTCTGATATTACA
GGGAACAACACGAATAAACTTAGTAAAAATCCTCTCTATAATTGTGCTGG
TATTGCTGCTATTGAGGTTATGAAAATGCTAGGGATTCGATCTGTTGGTC
TTTCTCTTTCGCTTGAGAAAGGTTTGCCGTTAGGGAGTGGATTGGGATCT
AGTGCTGCGAGTGCAGCTGCTGCTGCGATTGCTGTTAATGGATTGTTCGG
TGGGAAATTAGGAGTAGAGGAATTGGTTCTCGCGGGGTTGAAATCGGAAG
AGAAGGTTTCTGGATATCATGCGGATAATGTCGCACCGGCTATCATGGGG
GGTTTCATTCTGATTCGAAATTACGAACCCTTGGAATTGATTCGTTTGAA
ATTCCCCGTCGATAAGGAGCTGTTCTTCGTGTTGGTCAGCCCGGAATTCG
AAGCACCGACGAAGAAAATGCGGGCTGCGTTACCTGCTGAAGTTGGGATG
CCACACCATGTGTGGAATTCCAGCCAAGCCGGGGCGTTGGTGGCCGCGGT
GCTGCAGGGCGACACGATGGGATTGGGGAAAGCATTGTCCTCAGACAAAA
TTGTGGAGCCAAGGCGTTCCCCATTAATTCCAGGTATGGATGGTGTTAAG
AAGGCAGCCATTGCTGCTGGGGCATTTGGGTGCACGATAAGTGGAGCAGG
GCCAACGGCGGTGGCAGTGATCGATAACGAAGAGCAGGGGAAGGAGATTG
GTGAGAGGATGGTTATGGCGTTTCTGAAGGAAGGAAATTTGAAAACTGCG
GCATCTGTAAAGAGACTAGATCGAGTTGGTGCAAGGCTTATTGGATCAAC
TCCTTTAGATAGAGTTTTATGA

DOWNY MILDEW RESISTANT MELON PLANTS

CROSS-REFERENCE TO RELATED APPLICATIONS

This application is a U.S. National Phase application under 35 U.S.C. § 371 of International Application No. PCT/EP2019/063454, filed May 24, 2019, which is incorporated herein by reference in its entirety.

SUBMISSION OF SEQUENCE LISTING ON ASCII TEXT FILE

The content of the following submission on ASCII text file is incorporated herein by reference in its entirety: a computer readable form (CRF) of the Sequence Listing (file name: 701802017300SEQLIST.TXT, date recorded: Nov. 9, 2021, size: 9,718 bytes).

FIELD

The present disclosure relates to melon plants that are resistant to the plant disease downy mildew and especially relates to melon plants that are resistant to the downy mildew disease causing pathogen *Pseudoperonospora cubensis*. The present disclosure further relates to seeds, cells, tissues, or plant parts of the present melon plants and to methods for identifying downy mildew resistant melon plants.

BACKGROUND

Plants employ diverse constitutive and inducible defence strategies to counteract colonization by microbial pathogens and attacks of herbivorous insects. Plant responses induced upon pathogen encounter are triggered by non-self-recognition of common microbial structures and by highly pathogen-=specific effectors.

Obligate biotrophic phytopathogens such as the causal pathogens of powdery mildew and downy mildew employ highly specialized infection strategies. Genetic studies on *Arabidopsis* have identified several downy mildew resistance genes that appear to be involved in susceptibility to downy mildew oomycete pathogens. In *Arabidopsis*, knockdown mutations of these genes have been shown to provide protection against downy mildew. Map-based cloning revealed that a downy mildew resistance gene designated as DMR1 encodes a homoserine kinase (HSK) protein which catalyzes the conversion of homoserine to homoserine-4-phosphate, a step in the Aspartic acid (Asp)-derived Threonine (Thr) biosynthesis pathway. Mutating DMR1 causes the HSK protein substrate homoserine, which is present at low levels in the wild-type, to accumulate. The accumulation of homoserine is therefore one way to identify DMR1 mutant plants.

Because the DMR1 protein is important for the biosynthesis of essential amino acids, DMR1-based resistance (in which DMR1 is mutated) directly interferes with the biosynthesis of essential amino acids and overall plant vigour. This has made the development of viable and commercially interesting plants difficult. For example, if DMR1 expression is completely abolished (e.g., through introduction of a premature stop-codon in the coding sequence of DMR1), the resulting mutant plants have severely affected development or are unable to develop (i.e., the DMR1 mutation is lethal). Furthermore fruit set, ripening and fruit development may be affected, resulting in reduced fruit yield, quality and brix levels.

Accordingly, using DMR1-based resistance in plants requires a delicate balance between maintaining a sufficiently high concentration, or activity, of HSK protein in a plant cell to allow for adequate synthesis of essential amino acids and maintaining a sufficiently low concentration, or activity, of HSK protein in a plant cell to provide downy mildew resistance.

The genus *Cucumis* includes the majority of culinary melon species. The common name, "melon", typically refers to the annual species *Cucumis melo*, which belongs to the family Cucurbitaceae. Melon is also known as a muskmelon, rockmelon, Cantaloupe melon, or honeydew melon. Melon fruit is round-shaped, and often has a pale green skin that is rough, lightly ribbed, and warty.

*Pseudoperonospora cubensis* is an oomycete plant pathogen that is known for causing downy mildew on cucurbits such as melon. *Pseudoperonospora cubensis* is an obligate biotroph that causes brown- to black-colored chlorotic lesions on the foliage. During humid conditions, inspection of the underside of the leaf reveals gray-brown to purplish-black fungal growth. Eventually, leaves of infected plants turn necrotic and curl upwards.

Once the pathogen has been detected in an area, management is essential, as *Pseudoperonospora cubensis* is nearly impossible to eradicate. Between long-surviving resting spores and high levels of secondary inoculum, *Pseudoperonospora cubensis* can affect anywhere from 50% to 95% of melons in the field in a single season.

In addition, Powdery mildew is one of the main fungal diseases known in plants belonging to the Cucumis family such as *Cucumis melo* (melon), both in the field and greenhouse. Powdery mildew diseases in *Cucumis melo* (melon) are caused by the fungus *Podosphaera xanthii* (also designated as *Oidium erysiphoides*) and/or *Golovinomyces cicharacearum*. The disease is characterized by distinctive symptoms such as white powder-like spots on the leaves and stems. Generally, the lower leaves are the most affected, but the mildew can appear on any part of the plant that is exposed above ground. As the disease progresses, the spots get larger and thicker as massive numbers of spores form, and the mildew spreads up and down the length of the plant such on the stem and even the fruits. Severely affected leaves can become dry and brittle, or can wither and die. Because of the infection, the fruits can be smaller in size, fewer in number, less able to be successfully stored, sun scalded, incompletely ripe, and having a poor flavor. It may also predispose plants to be more vulnerable to other pathogens. Eventually, the plant can die.

Although many biological control products have been evaluated for their ability to control mildew infections (e.g. downy or powdery mildew), none have proven effective, and so they are not recommended for use. Chemical control is effective and recommended because downy mildew is an aggressive and destructive disease and satisfactory control without the use of fungicides is unlikely. Such products need to be applied often to prevent pathogen resistance, and combinations or rotations with fungicides of a different mode of action are used to avoid pathogen resistance. However, some strains of *Pseudoperonospora cubensis*, *Podosphaera xanthii*, and *Golovinomyces cicharacearum* show resistance to fungicides.

Considering the above, there is a need in the art for melons (*Cucumis melo*), plants in which resistance is encoded by a genetic determinant or resistance gene. It is an object of the present disclosure, amongst other objects, to address this need in the art.

BRIEF SUMMARY

This object of the present disclosure, amongst other objects, is met by the provision of a *Cucumis melo* plant as outlined in the appended claims.

Specifically, this object of the present disclosure, amongst other objects, is met by a downy mildew resistant melon plant, wherein said melon plant comprises in its genome a homoserine kinase gene expressing a mutated homoserine kinase protein, wherein the mutation of the homoserine kinase protein comprises an amino acid substitution of the amino acid alanine (A) to the amino acid threonine (T) at position 349 of an homoserine kinase protein of which the amino acid sequence is shown in SEQ ID No. 1. The melon plant is preferably a *Cucumis melo* plant. SEQ ID No.1 represents the wild type homoserine kinase protein sequence, not having the mutation, and SEQ ID No.2 represents its coding sequence. The amino acid sequence of the homoserine kinase protein comprising the A349T mutation is shown in SEQ ID No. 3 and its coding sequence in SEQ ID No. 4.

The present inventors have surprisingly found that through amino acid substitution or a reduced, but not absent, expression, a sufficient activity of homoserine kinase (HSK) can be maintained in melon plants (*Cucumis melo*) to allow for synthesis of essential amino acids and, simultaneously, a sufficient low activity of homoserine kinase (HSK) can be obtained to provide downy mildew resistance.

The mutation A349T in the wild type protein sequence of HSK (SEQ ID No. 1) can be provided by generally known plant mutagenesis techniques such as ethyl methane sulfonate (EMS), CRISPR-Cas, radiation, or by genetic modification of the HSK coding sequence as shown in SEQ ID No. 2.

According to a preferred embodiment, the present disclosure relates to the downy mildew resistant melon plant, wherein the plant is furthermore resistant to powdery mildew.

According to a preferred embodiment, the present disclosure relates to the downy mildew resistant melon plant, wherein said homoserine kinase gene is homozygously present in the genome of said melon plant. Experiments show that the mutation in the homoserine kinase has a recessive effect and therefore is preferably homozygous in the genome to affect homoserine accumulation and downy mildew resistance in melon (*Cucumis melo*).

According to another preferred embodiment, the present disclosure relates to the downy mildew resistant melon plant, wherein said melon plant comprises in its genome a homoserine kinase gene expressing a homoserine kinase protein of which the amino acid sequence is shown in SEQ ID No. 3.

According to yet another preferred embodiment, the present disclosure relates to the downy mildew resistant melon plant, wherein said melon plant comprises in its genome a homoserine kinase gene encoding a mutated cDNA, wherein the mutation of the cDNA comprises a nucleotide change of guanine to adenine at position 1045 in the cDNA sequence of SEQ ID No. 2.

According to a preferred embodiment, the present disclosure relates to the downy mildew resistant melon plant, wherein said melon plant comprises in its genome a homoserine kinase gene encoding the cDNA sequence of SEQ ID No. 4.

According to another preferred embodiment, the present disclosure relates to the downy mildew resistant melon plant, wherein downy mildew is caused by the pathogen *Pseudoperonospora cubensis*.

According to another preferred embodiment, the present disclosure relates to the downy mildew resistant melon plant, wherein powdery mildew is caused by the pathogen *Podosphaera xanthii* and/or *Golovinomyces cicharacearum*.

According to another preferred embodiment, the present disclosure relates to downy mildew resistant melon plant, wherein the mutation of the homoserine kinase protein provides an in planta homoserine concentration of 200 to 1000 ng/mg fresh weight in the leaves of said plant. As indicated above, DMR1 (HSK) based resistance requires a delicate balancing between maintaining a sufficiently high concentration, or activity, of homoserine kinase (HSK) protein in a plant cell to allow for synthesis of essential amino acids and a sufficiently low concentration, or activity, of HSK protein in a plant cell to provide downy mildew resistance.

The present inventors have surprisingly found that in planta homoserine concentrations of at least 200 ng/mg fresh weight in the leaves, through amino acid substitution A349T in the HSK protein sequence, provides the present downy mildew resistance. It is noted that in susceptible plants homoserine concentrations are considerably lower than 200 ng/mg fresh weight.

According to yet another preferred embodiment, the present disclosure relates to the downy mildew resistant melon plant, wherein the mutation of the homoserine kinase protein provides an in planta homoserine concentration of 300 to 700 ng/mg fresh in the leaves, preferably 400 to 600 ng/mg, more preferably 450 to 550 ng/mg.

Considering the benefits of the melon plant (*Cucumis melo*) as outlined above, the present disclosure also relates to seed, cell, fruit or plant part of the melon plant of present disclosure, wherein said seed, cell or plant part comprises in its genome a homoserine kinase gene capable of expressing a mutated homoserine kinase protein, wherein the mutation of the homoserine kinase protein comprises an amino acid substitution of the amino acid alanine (A) to the amino acid threonine (T) at position 349 of an homoserine kinase protein of which the amino acid sequence is shown in SEQ ID No. 1. The melon fruit obtained from a melon plant according to present disclosure, i.e. comprising the mutation in the DMR1 gene, was of good quality and suitable for commercial use.

According to another more preferred embodiment, the present disclosure relates to a mutated homoserine kinase protein, wherein the mutation comprises an amino acid substitution of the amino acid alanine (A) to the amino acid threonine (T) at position 349 of a homoserine kinase protein of which the amino acid sequence is shown in SEQ ID No. 1. The mutated homoserine kinase protein sequence is shown in SEQ ID No. 3.

According to a further aspect, the present disclosure relates to a cDNA capable of being translated into the mutated homoserine kinase of present disclosure or to a homoserine kinase gene capable of expressing the mutated homoserine kinase protein or of being transcribed into the cDNA.

According to a further aspect, the present disclosure relates to methods for identifying a mildew resistant melon, said method comprises the step of establishing the presence of the mutated homoserine kinase protein, the cDNA or the gene of present disclosure in said melon plant. Preferably. The method of present invention can identify downy mildew and/or powdery mildew resistant melon plants.

According to a preferred embodiment, the present disclosure relates to the method, wherein said method comprises the step of establishing the presence of SEQ ID No. 3 or SEQ ID No. 4 in the melon plant.

According to a further aspect, the present disclosure relates to the use of the homoserine kinase gene of present disclosure, or the cDNA sequence thereof, for providing melon plants being resistant or having an increased resistance to the plant pathogen that causes mildew. Preferably the plant has increased resistance against the pathogen that causes downy mildew and/or powdery mildew Certain aspects of the present disclosure relate to an isolated *Pseudoperonospora cubensis* resistant melon (*Cucumis melo*) plant, wherein the melon plant includes amino acid sequence SEQ ID NO: 3. In some embodiments, the melon plant includes a gene encoding a protein having amino acid sequence SEQ ID NO: 3. In some embodiments, the gene is homozygously present in the genome of the melon plant. In some embodiments that may be combined with any of the preceding embodiments, the melon plant includes nucleotide sequence SEQ ID NO: 4. In some embodiments that may be combined with any of the preceding embodiments, the melon plant includes a gene with a coding sequence of nucleotide sequence SEQ ID NO: 4. In some embodiments, the gene is homozygously present in the genome of the melon plant.

In another aspect, the present disclosure provides an isolated *Pseudoperonospora cubensis* resistant melon (*Cucumis melo*) plant, wherein the melon plant includes a mutated homoserine kinase gene encoding a mutated homoserine kinase protein, and wherein the mutation of the homoserine kinase protein includes an Alanine (A) to Threonine (T) amino acid substitution at a position corresponding to amino acid 349 of reference sequence SEQ ID NO: 1. In some embodiments, the mutated homoserine kinase gene has a mutated coding sequence wherein the mutation replaces a Guanine (G) with an Adenine (A) at a position corresponding to nucleotide 1045 of reference sequence SEQ ID NO: 2. In some embodiments, the mutated coding sequence is homozygously present.

In some embodiments that may be combined with any of the preceding embodiments, the in planta homoserine concentration is about 200 to about 1000 ng/mg fresh weight in leaves of the plant. In some embodiments that may be combined with any of the preceding embodiments, the in planta homoserine concentration is about 300 to about 700 ng/mg, about 400 to about 600 ng/mg, or about 450 to 550 ng/mg fresh weight in leaves of the plant. In some embodiments that may be combined with any of the preceding embodiments, the in planta homoserine concentration is the result of the presence of SEQ ID NO: 3, the presence of SEQ ID NO: 4, the mutated homoserine kinase protein, the mutated coding sequence, or a combination thereof.

In some embodiments that may be combined with any of the preceding embodiments, the present disclosure provides a seed, cell, tissue, or plant part of an isolated melon plant including amino acid sequence SEQ ID NO: 3. In some embodiments, the seed, cell, tissue, or plant part includes a gene encoding a protein having amino acid sequence SEQ ID NO: 3. In some embodiments, the gene is homozygously present in the genome of the seed, cell, tissue, or plant part of the melon plant. In some embodiments that may be combined with any of the preceding embodiments, the seed, cell, tissue, or plant part of the melon plant includes nucleotide sequence SEQ ID NO: 4. In some embodiments that may be combined with any of the preceding embodiments, the seed, cell, tissue, or plant part of the melon plant includes a gene with a coding sequence of nucleotide sequence SEQ ID NO: 4. In some embodiments, the gene is homozygously present in the genome of the melon plant. In some embodiments that may be combined with any of the preceding embodiments, the present disclosure provides a seed, cell, tissue, or plant part of an isolated melon plant including a mutated homoserine kinase gene encoding a mutated homoserine kinase protein, wherein the mutation of the homoserine kinase protein includes an Alanine (A) to Threonine (T) amino acid substitution at a position corresponding to amino acid 349 of reference sequence SEQ ID NO: 1. In some embodiments, the mutated homoserine kinase gene has a mutated coding sequence wherein the mutation replaces a Guanine (G) with an Adenine (A) at a position corresponding to nucleotide 1045 of reference sequence SEQ ID NO: 2. In some embodiments, the mutated coding sequence is homozygously present.

In an additional aspect, the present disclosure provides a method for identifying a *Pseudoperonospora cubensis* resistant melon plant including: establishing the presence of nucleotide sequence SEQ ID NO: 4 or establishing the presence of amino acid sequence SEQ ID NO: 3. In another aspect, the present disclosure provides a method for identifying a *Pseudoperonospora cubensis* resistant melon plant including: establishing the presence of a homoserine kinase coding sequence having nucleotide sequence SEQ ID NO: 4 or establishing the presence of a homoserine kinase protein having amino acid sequence SEQ ID NO: 3.

In yet another aspect, the present disclosure provides a method for obtaining a *Pseudoperonospora cubensis* resistant melon (*Cucumis melo*) plant, including: mutating an amino acid sequence, wherein the mutation of the amino acid includes an Alanine (A) to Threonine (T) amino acid substitution at a position corresponding to amino acid 349 of reference sequence SEQ ID NO: 1. In still another aspect, the present disclosure provides a method for obtaining a *Pseudoperonospora cubensis* resistant melon (*Cucumis melo*) plant, including: mutating a homoserine kinase protein, wherein the mutation of the homoserine kinase protein includes an Alanine (A) to Threonine (T) amino acid substitution at a position corresponding to amino acid 349 of reference sequence SEQ ID NO: 1. In some embodiments that may be combined with any of the preceding embodiments, the mutated amino acid sequence or mutated homoserine kinase protein has amino acid sequence SEQ ID NO: 3.

In a further aspect, the present disclosure provides a method for obtaining a *Pseudoperonospora cubensis* resistant melon (*Cucumis melo*) plant, including: mutating a nucleotide sequence, wherein the mutation of the nucleotide sequence replaces a Guanine (G) with an Adenine (A) at a position corresponding to nucleotide 1045 of reference sequence SEQ ID NO: 2. In another aspect, the present disclosure provides a method for obtaining a *Pseudoperonospora cubensis* resistant melon (*Cucumis melo*) plant, including: mutating a homoserine kinase coding sequence, wherein the mutation of the coding sequence replaces a Guanine (G) with an Adenine (A) at a position corresponding to nucleotide 1045 of reference sequence SEQ ID NO: 2. In some embodiments that may be combined with any of the preceding embodiments, the mutated nucleotide sequence or mutated coding sequence has nucleotide sequence SEQ ID NO: 4.

Yet another aspect of the present disclosure relates to a *Pseudoperonospora cubensis* resistant melon plant produced by any one of the preceding methods. In some embodiments, the melon plant includes amino acid sequence SEQ ID NO: 3. In some embodiments that may be combined with any of the preceding embodiments, the melon plant includes nucleotide sequence SEQ ID NO: 4. In some embodiments that may be combined with any of the preceding embodiments, the in planta homoserine concentration is about 200 to about 1000 ng/mg fresh weight in leaves of the plant. In some embodiments that may be combined with any of the preceding embodiments, the in planta homoserine concentration is about 300 to about 700 ng/mg, about 400 to about 600 ng/mg, or about 450 to 550 ng/mg fresh weight in leaves of the plant. In some embodiments that may be combined with any of the preceding embodiments, the in planta homoserine concentration is the result of the presence of SEQ ID NO: 3, the presence of SEQ ID NO: 4, the mutated homoserine kinase protein, the mutated coding sequence, or any combination thereof. Still another aspect of the present disclosure relates to a seed, cell, tissue, or plant part of the *Pseudoperonospora cubensis* resistant melon plant of any of the preceding embodiments.

BRIEF DESCRIPTION OF THE DRAWINGS

FIG. 2A shows wild type *Cucumis melo* plants, which have brown-colored chlorotic lesions on the foliage. FIG. 2B shows A349T mutant *Cucumis melo* plants, which have healthy foliage and are unaffected by the pathogen.

FIG. 3 shows the protein sequence (SEQ ID No. 1) of the wild type HSK of *Cucumis melo*. SEQ ID No. 2 shows the cDNA sequence encoding the wild type HSK.

FIG. 4 shows the A349T mutant protein sequence (SEQ ID No. 3) of HSK of *Cucumis melo*. SEQ ID No. 4 shows the cDNA sequence encoding the mutant HSK.

FIG. 5A shows wild type *Cucumis melo* plants, which have white-colored powdered sporulation on the foliage. FIG. 5B shows A349T mutant *Cucumis melo* plants, which have healthy foliage and are unaffected by the pathogen.

DETAILED DESCRIPTION

Homoserine Kinase (HSK) Genes and Proteins

Figure 1:
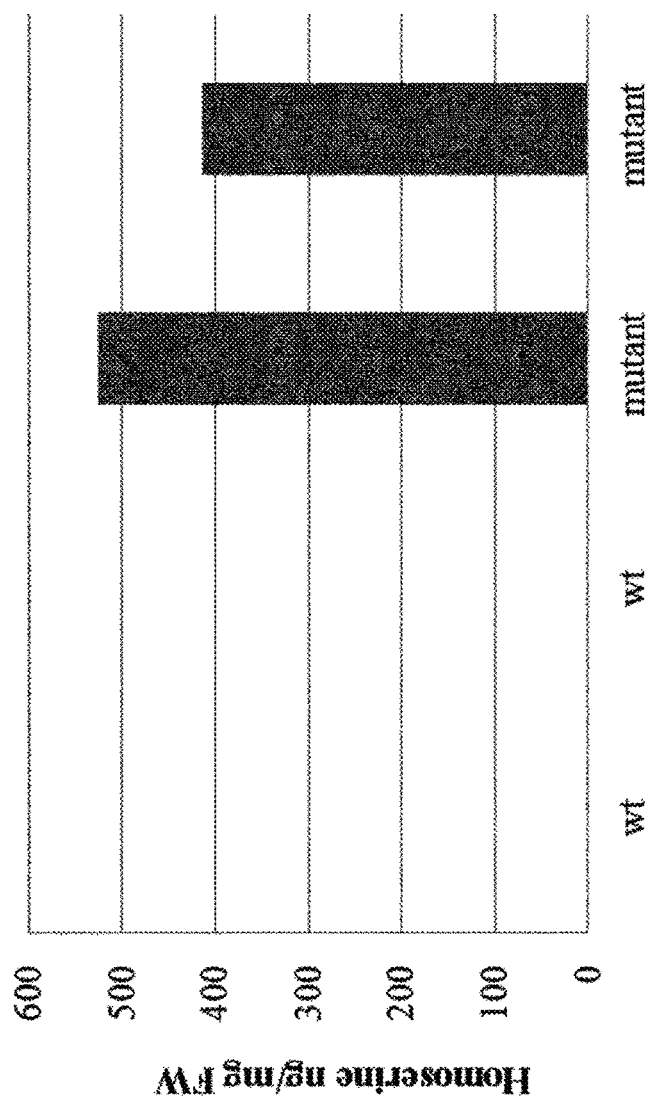
FIG. 1 shows the homoserine concentration in ng/mg fresh weight (FW) of wild type (Vedrantais melon) and A349T mutant *Cucumis melo* plants. Wild type (wt) plants that have a wild type HSK protein do not accumulate homoserine. A349T mutant plants accumulates levels of homoserine of approximately between 400 to 550 ng/mg FW. Homoserine concentrations shown in FIG. 1 were measured twice.

The present disclosure generally relates to plants having a mutant homoserine kinase (HSK) gene. In some embodiments, a single nucleotide substitution in the coding sequence of the HSK gene results in downy mildew (e.g., *Pseudoperonospora cubensis*) resistance.

In some aspects, plants of the present disclosure relate to the downy mildew resistant melon plant, wherein the plant is furthermore resistant to powdery mildew.

In some aspects, plants of the present disclosure are *Cucumis melo* plants, also known as melon plants. Melon plants contain one HSK gene, designated CmHSK, and also known as CmDMR1. In some aspects, plants of the present disclosure have a mutation in the coding sequence of the HSK gene.

The nucleotide coding sequence of CmHSK is set forth in SEQ ID NO: 2. Provided herein are also homologs and orthologs of CmHSK. In some embodiments, a homolog or ortholog of CmHSK has a nucleic acid coding sequence that is at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, or at least 99% identical to SEQ ID NO: 2. In some embodiments, a nucleic acid sequence encoding a homolog or ortholog of CmHSK may also have a mutation.

In some aspects, plants of the present disclosure have a mutation in the coding sequence of the CmHSK gene that replaces a Guanine (G) with an Adenine (A) at a position corresponding to nucleotide 1045 of SEQ ID NO: 2 (i.e., a G1045A mutation). In some aspects, plants of the present disclosure have a G1045A mutant HSK coding sequence set forth in SEQ ID NO: 4.

In some aspects, plants of the present disclosure have a mutation in the amino acid sequence of the CmHSK protein. In some embodiments, the mutation is the result of the mutation in the coding sequence of the HSK gene.

The protein sequence of CmHSK is set forth in SEQ ID NO: 1. Provided herein are also homologs and orthologs of CmHSK. In some embodiments, a homolog or ortholog of CmHSK has an amino acid coding sequence that is at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, or at least 99% identical to SEQ ID NO: 1. In some embodiments, an amino acid sequence encoding a homolog or ortholog of CmHSK may also have a mutation.

In some aspects, plants of the present disclosure have a mutation in the amino acid sequence of the CmHSK protein that replaces an Alanine (A) with a Threonine (T) at a position corresponding to amino acid 349 of SEQ ID NO: 1 (i.e., an A349T mutation). In some aspects, plants of the present disclosure have an A349T mutant HSK protein set forth in SEQ ID NO: 3.

In some aspects, the mutation may be a point mutation, a substitution mutation, wherein the mutation alters the coding sequence of the HSK gene and/or HSK polypeptide. In some aspects, the mutation may be a point mutation, a substitution mutation, wherein the mutation reduces the expression or activity of the HSK gene and/or HSK polypeptide.

A modified nucleic acid of the present disclosure (e.g., a mutated HSK gene) in a plant cell may have its expression or activity reduced by at least about 5%, at least about 10%, at least about 15%, at least about 20%, at least about 25%, at least about 30%, at least about 40%, at least about 50%, at least about 55%, at least about 60%, at least about 65%, at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, at least about 99%, or at least about 100% as compared to a corresponding control. Various controls will be readily apparent to one of skill in the art. For example, a control may be a corresponding plant or plant cell that does not contain a mutated nucleic acid encoding a mutated HSK polypeptide of the present disclosure.

A modified polypeptide of the present disclosure (e.g., a modified HSK polypeptide having reduced expression or activity) in a plant cell may have its expression or activity reduced by at least about 5%, at least about 10%, at least about 15%, at least about 20%, at least about 25%, at least about 30%, at least about 40%, at least about 50%, at least about 55%, at least about 60%, at least about 65%, at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, at least about 99%, or at least about 100% as compared to a corresponding control. Various controls will be readily apparent to one of skill in the art. For example, a control may be a corresponding plant or plant cell that does not contain a modified HSK polypeptide of the present disclosure.

Homoserine Concentration

The present disclosure generally relates to plants having an in planta homoserine concentration of about 200 to about 1000 ng/mg fresh weight in the leaves of the plant. It was surprisingly found that in planta homoserine concentrations of at least 200 ng/mg fresh weight in the leaves provided downy mildew (e.g., *Pseudoperonospora cubensis*) resistance. It was further found that in susceptible plants, homoserine concentrations were considerably lower than 200 ng/mg fresh weight in the leaves.

Plants of the present disclosure with an in planta homoserine concentration of about 200 to about 1000 ng/mg fresh weight in the leaves of the plant may have an in planta homoserine concentration of at least about 200 ng/mg, at least about 225 ng/mg, at least about 250 ng/mg, at least about 275 ng/mg, at least about 300 ng/mg, at least about 325 ng/mg, at least about 350 ng/mg, at least about 375 ng/mg, at least about 400 ng/mg, at least about 425 ng/mg, at least about 450 ng/mg, at least about 475 ng/mg, at least about 500 ng/mg, at least about 525 ng/mg, at least about 550 ng/mg, at least about 575 ng/mg, at least about 600 ng/mg, at least about 625 ng/mg, at least about 650 ng/mg, at least about 675 ng/mg, at least about 700 ng/mg, at least about 725 ng/mg, at least about 750 ng/mg, at least about 775 ng/mg, at least about 800 ng/mg, at least about 825 ng/mg, at least about 850 ng/mg, at least about 875 ng/mg, at least about 900 ng/mg, at least about 925 ng/mg, at least about 950 ng/mg, at least about 975 ng/mg, or about 1000 ng/mg fresh weight in the leaves of the plant. In some embodiments, plants of the present disclosure have an in planta homoserine concentration of at least about 300 ng/mg, at least about 350 ng/mg, at least about 400 ng/mg, at least about 450 ng/mg, at least about 500 ng/mg, at least about 550 ng/mg, at least about 600 ng/mg, at least about 650 ng/mg, or at least about 700 ng/mg fresh weight in the leaves of the plant.

Plants of the present disclosure may have in planta homoserine concentrations of between about 300-700 ng/mg fresh weight in the leaves of the plant. In some embodiments, plants of the present disclosure may have in planta homoserine concentrations of between about 300-350 ng/mg, about 300-400 ng/mg, about 300-450 ng/mg, about 300-500 ng/mg, about 300-550 ng/mg, about 300-600 ng/mg, about 300-650 ng/mg, about 300-700 ng/mg, about 400-450 ng/mg, about 400-500 ng/mg, about 400-550 ng/mg, about 400-600 ng/mg, about 400-650 ng/mg, about 400-700 ng/mg, about 450-500 ng/mg, about 450-550 ng/mg, about 450-600 ng/mg, about 450-650 ng/mg, about 450-700 ng/mg, about 500-550 ng/mg, about 500-600 ng/mg, about 500-650 ng/mg, about 500-700 ng/mg, about 550-600 ng/mg, about 550-650 ng/mg, about 550-700 ng/mg, about 600-650 ng/mg, about 600-700 ng/mg, or about 650-700 ng/mg fresh weight in the leaves of the plant. In some embodiments, plants of the present disclosure may have in planta homoserine concentrations of between about 400-600 ng/mg or about 450-550 ng/mg fresh weight in the leaves of the plant.

Plants of the Present Disclosure

In some aspects, plants of the present disclosure are plants of the family Cucurbitaceae and of the genus *Cucumis*. In some embodiments, plants of the present disclosure are plants of the species *Cucumis melo*. In some embodiments, plants of the present disclosure are melon plants.

According to the present description plant parts include, but are not limited to, leaves, stems, meristems, cotyledons, hypocotyl, roots, root tips, root meristems, ovules, pollen, anthers, pistils, flowers, embryos, seeds, fruits, parts of fruits, cells, and the like. Plant tissues may be tissues or any plant part. Plant cells may be cells of any plant part. The melon fruit obtained from a melon plant according to present disclosure, i.e. comprising the mutation in the DMR1 gene, was of good quality and suitable for commercial use.

Plants of the present disclosure include plants with increased in planta homoserine concentration as compared to a control plant (e.g., a plant of the same species that does not have a mutated HSK gene or protein, for example, a wild-type plant). In some embodiments, plants of the present disclosure have an in planta homoserine concentration of at least 200 ng/mg fresh weight in the leaves of the plant. In some embodiments, plants of the present disclosure have an in planta homoserine concentration of about 200 to about 1000 ng/mg fresh weight in the leaves of the plant. In some embodiments, plants of the present disclosure may have an in planta homoserine concentration of at least about 200 ng/mg, at least about 225 ng/mg, at least about 250 ng/mg, at least about 275 ng/mg, at least about 300 ng/mg, at least about 325 ng/mg, at least about 350 ng/mg, at least about 375 ng/mg, at least about 400 ng/mg, at least about 425 ng/mg, at least about 450 ng/mg, at least about 475 ng/mg, at least about 500 ng/mg, at least about 525 ng/mg, at least about 550 ng/mg, at least about 575 ng/mg, at least about 600 ng/mg, at least about 625 ng/mg, at least about 650 ng/mg, at least about 675 ng/mg, at least about 700 ng/mg, at least about 725 ng/mg, at least about 750 ng/mg, at least about 775 ng/mg, at least about 800 ng/mg, at least about 825 ng/mg, at least about 850 ng/mg, at least about 875 ng/mg, at least about 900 ng/mg, at least about 925 ng/mg, at least about 950 ng/mg, at least about 975 ng/mg, or about 1000 ng/mg fresh weight in the leaves of the plant. In some embodiments, plants of the present disclosure have an in planta homoserine concentration of at least about 300 ng/mg, at least about 350 ng/mg, at least about 400 ng/mg, at least about 450 ng/mg, at least about 500 ng/mg, at least about 550 ng/mg, at least about 600 ng/mg, at least about 650 ng/mg, or at least about 700 ng/mg fresh weight in the leaves of the plant. In some embodiments, plants of the present disclosure may have in planta homoserine concentrations of between about 300-700 ng/mg fresh weight in the leaves of the plant. In some embodiments, plants of the present disclosure may have in planta homoserine concentrations of between about 300-350 ng/mg, about 300-400 ng/mg, about 300-450 ng/mg, about 300-500 ng/mg, about 300-550 ng/mg, about 300-600 ng/mg, about 300-650 ng/mg, about 300-700 ng/mg, about 400-450 ng/mg, about 400-500 ng/mg, about 400-550 ng/mg, about 400-600 ng/mg, about 400-650 ng/mg, about 400-700 ng/mg, about 450-500 ng/mg, about 450-550 ng/mg, about 450-600 ng/mg, about 450-650 ng/mg, about 450-700 ng/mg, about 500-550 ng/mg, about 500-600 ng/mg, about 500-650 ng/mg, about 500-700 ng/mg, about 550-600 ng/mg, about 550-650 ng/mg, about 550-700 ng/mg, about 600-650 ng/mg, about 600-700 ng/mg, or about 650-700 ng/mg fresh weight in the leaves of the plant. In some embodiments, plants of the present disclosure may have in planta homoserine concentrations of between about 400-600 ng/mg or about 450-550 ng/mg fresh weight in the leaves of the plant. Plants can be tested for in planta homoserine concentrations using commonly known methods in the art.

Methods of Increasing Homoserine, Mutating HSK, and Obtaining Plants of the Present Disclosure The endogenous homoserine level can be increased by lowering the enzymatic activity of the homoserine kinase gene which leads to a lower conversion of homoserine (e.g., into downstream intermediates in the amino acid biosynthesis pathways) and as a result, homoserine accumulates. Alternatively, the expression of the homoserine kinase enzyme can be reduced. This also leads to a lower conversion of homoserine and results in homoserine accumulation. Reducing the expression of the homoserine kinase gene can in itself be achieved in various ways, either directly, such as by gene silencing, or indirectly by modifying the regulatory sequences thereof or by stimulating repression of the gene.

Modulating the HSK gene to lower its activity or expression can be achieved at various levels. In particular, to achieve a reduced HSK activity, the expression of the HSK gene can be down-regulated or the enzymatic activity of the HSK protein can be reduced by amino acid substitutions resulting from nucleotide changes in the HSK coding sequence.

In some embodiments, the endogenous HSK gene can be directly mutated. Alternatively, the expression of HSK can be reduced at the regulatory level, for example by modifying the regulatory sequences or by gene silencing. In some embodiments, one or more regulators of the HSK gene are downregulated (in case of transcriptional activators) by RNA interference (RNAi), virus-induced gene silencing (VIGS), small RNA-mediated post-transcriptional gene silencing, transcription activator-like effector nuclease (TALEN) gene editing techniques, clustered Regularly Interspaced Short Palindromic Repeat (CRISPR/Cas9) gene editing techniques, and/or zinc-finger nuclease (ZFN) gene editing techniques. In other embodiments, regulators are upregulated (in case of repressor proteins) by transgenic overexpression. Overexpression is achieved in a particular embodiment by expressing repressor proteins of the HSK gene from a strong promoter, e.g. the 35S promoter that is commonly used in plant biotechnology. The downregulation of the HSK gene can also be achieved by mutagenesis of the regulatory elements in the promoter, terminator region, or potential introns.

Mutations that affect expression or activity of HSK are induced in plants by using mutagenic chemicals such as ethyl methane sulfonate (EMS), by irradiation of plant material with gamma rays or fast neutrons, or by other means. The resulting nucleotide changes are random, but in a large collection of mutagenized plants the mutations in the HSK gene can be readily identified by using the TILLING (Targeting Induced Local Lesions IN Genomes) method (McCallum et al. (2000) Targeted screening for induced mutations. Nat. Biotechnol. 18, 455-457, and Henikoff et al. (2004) TILLING. Traditional mutagenesis meets functional genomics. Plant Physiol. 135, 630-636). The principle of this method is based on the PCR amplification of the gene of interest from genomic DNA of a large collection of mutagenized plants in the M2 generation. By DNA sequencing or by looking for point mutations using a single-strand specific nuclease, such as the CEL-I nuclease (Till et al. (2004) Mismatch cleavage by single-strand specific nucleases. Nucleic Acids Res. 32, 2632-2641), the individual plants that have a mutation in the gene of interest are identified. By screening many plants, a large collection of mutant alleles is obtained, each giving a different effect on gene expression or enzyme activity.

Mutations in HSK can also be induced in plants by using a gene editing technique, which enables targeted mutation. In some embodiments, the gene editing technique is selected from the group of transcription activator-like effector nuclease (TALEN) gene editing techniques, clustered Regularly Interspaced Short Palindromic Repeat (CRISPR/Cas9) gene editing techniques, or zinc-finger nuclease (ZFN) gene editing techniques. In some embodiments, the mutation is introduced using one or more vectors including gene editing components selected from the group of a CRISPR/Cas9 system, a TALEN, a zinc finger, and a meganuclease designed to target a nucleic acid sequence encoding a HSK gene.

A modified HSK gene can be brought into the plant by means of transgenic techniques. Plant transformation involves the construction of an expression vector that will function in plant cells. Such a vector comprises DNA comprising a gene under control of or operatively linked to a regulatory element (for example, a promoter). The expression vector may contain one or more such operably linked gene/regulatory element combinations. The vector(s) may be in the form of a plasmid, and can be used alone or in combination with other plasmids, to provide transformed melon plants. Promoters may be inducible, constitutive, tissue-specific or tissue-preferred. Methods for plant transformation include biological methods and physical methods (See, for example, Miki, et al., "Procedures for Introducing Foreign DNA into Plants" in *Methods in Plant Molecular Biology and Biotechnology*, Glick and Thompson Eds., CRC Press, Inc., Boca Raton, pp. 67-88 (1993)). In addition, expression vectors and in vitro culture methods for plant cell or tissue transformation and regeneration of plants are available (See, for example, Gruber, et al., "Vectors for Plant Transformation" in Methods in *Plant Molecular Biology and Biotechnology*, Glick and Thompson Eds., CRC Press, Inc., Boca Raton, pp. 89-119 (1993)). The produced transgenic line could then be crossed, with another (non-transformed or transformed) line, in order to produce a new transgenic melon line. Alternatively, a genetic trait which has been engineered into a particular melon cultivar using the foregoing transformation techniques could be moved into another line using traditional backcrossing techniques that are well known in the plant breeding arts. For example, a backcrossing approach could be used to move an engineered trait from a public, non-elite inbred line into an elite inbred line, or from an inbred line containing a foreign gene in its genome into an inbred line or lines which do not contain that gene.

A modified HSK gene can be brought into the plant by means of breeding. The breeding technique called backcrossing allows essentially all of the desired morphological and physiological characteristics of a cultivar to be recovered in addition to the single gene transferred into the line (e.g., the modified HSK gene). The parental melon plant which contributes the gene for the desired characteristic (e.g., the modified HSK gene) is termed the nonrecurrent or donor parent. This terminology refers to the fact that the nonrecurrent parent is used one time in the backcross protocol and therefore does not recur. The parental melon plant to which the gene or genes from the nonrecurrent parent are transferred is known as the recurrent parent as it is used for several rounds in the backcrossing protocol. In a typical backcross protocol, the original cultivar of interest (recurrent parent) is crossed to a second line (nonrecurrent parent) that carries the single gene of interest to be transferred. The resulting progeny from this cross are then crossed again to the recurrent parent and the process is repeated until a melon plant is obtained wherein essentially all of the desired morphological and physiological characteristics of the recurrent parent are recovered in the converted plant, in addition to the single transferred gene from the nonrecurrent parent. The present disclosure further relates to methods for developing melon plants in a melon plant breeding program using plant breeding techniques including recurrent selection, backcrossing, pedigree breeding, restriction fragment length polymorphism enhanced selection, and genetic marker enhanced selection.

Plants of the present disclosure can be identified by multiple methods. The gene expression or protein levels can for example be tested by analysis of HSK transcript levels (e.g. by RT-PCR). Another option is the quantification of HSK protein levels with antibodies, or amino acid analysis, measuring homoserine accumulation as a result of reduced HSK activity. The skilled person can also use the usual pathogen tests to see if the homoserine accumulation is sufficient to induce pathogen resistance. These methods are known to the person skilled in the art and can be used to identify plants of the present disclosure. Plants with the desired reduced HSK level or HSK expression are then propagated, back-crossed, or crossed to other breeding lines to transfer only the desired new allele into the background of the crop wanted.

EXAMPLES

The following examples are provided to further illustrate aspects of the present disclosure. These examples are non-limiting and should not be construed as limiting any aspect of the present disclosure.

Example 1: Generation of HSK A349T Mutant *Cucumis melo* Plants

Seeds of melon variety Védrantais were treated with the mutagenic agent Ethyl Methanesulfonate (EMS) in order to introduce random point mutations. The HSK (dmr1) gene located on chromosome 1 was the target gene for the introduction of random point mutations. Mutated plants were grown to produce seeds and the next generation was screened for increased accumulation of homoserine. This was achieved by measuring levels of the amino acid homoserine. In addition, samples were taken from the top of the developing shoots of the melon plants for further molecular analysis, i.e., the detection of mutations in candidate genes as described by Van Eijk and Van Tunen in EP 1929039.

This process identified the A349T mutant, which was selected. The A349T mutation was an Alanine (A) to Threonine (T) amino acid substitution at a position corresponding to amino acid 349 of the HSK protein (WT HSK protein sequence=SEQ ID NO: 1; mutant A349T HSK protein sequence=SEQ ID NO: 3). Further, the HSK coding sequence was mutated in A349T mutant plants. Specifically, a Guanine (G) was replaced with an Adenine (A) at a position corresponding to nucleotide 1045 in the HSK coding sequence (WT HSK coding sequence=SEQ ID NO: 2; mutant G1045A HSK coding sequence=SEQ ID NO: 4).

The A349T mutant plants had high homoserine concentration in ng/mg fresh weight (FW) of plant leaves. The A349T mutant plants were made homozygous by selfing or inter-crossing. The homozygous A349T mutant plants showed full resistance to downy mildew upon *Pseudoperonospora cubensis* infection (see Example 2).

Example 2: Downy Mildew (*Pseudoperonospora cubensis*) Infection Assay

Wild type and A349T mutant melon (*Cucumis melo*) plants (Vedrantais melon) were infected with downy mildew (*Pseudoperonospora cubensis*). For A349T mutants, both heterozygous and homozygous plants were tested (zygosity of the plants was determined by the presence of the G1045A mutation). Infection with *P. cubensis* was done when the plants had 5-8 leaves.

The first disease scoring was done 24 to 31 days after infection. Disease scoring was then performed for 4 weeks, and measurements were taken once per week on a wild type (WT) plant, an A349T heterozygous (HE) plant, and an A349T homozygous (HO) plant. Table 1 provides a detailed description of the disease scoring scale used in the infection assay. Briefly, disease scoring was performed on the scale of 1 to 8, where a score of 1 meant plants were fully susceptible and showed necrosis while a score of 8 meant plants were fully resistant and showed no symptoms of infection.

TABLE 1

Downy mildew assay scoring scale

| Score | Lower surface of leaf phenotype | Upper surface of leaf phenotype |
|---|---|---|
| 1 | Heavy sporulation | Completely yellow with dry areas |
| 2 | Heavy sporulation | Angular yellow spots that cover more than 85% of the surface |
| 3 | Heavy sporulation | Angular yellow spots that cover more than 75% of the surface |
| 4 | Heavy sporulation | Angular yellow spots that cover more than 50% of the surface |
| 5 | Sporulation | Angular yellow spots that cover 30-50% of the surface |
| 6 | Slight sporulation | Angular yellow spots that cover 10-30% of the surface |
| 7 | No sporulation | Angular yellow spots that cover less than 10% of the surface |
| 8 | No symptoms | No symptoms |

Figure 2A:
FIGS. 2A-2B show representative images of downy mildew (*Pseudoperonospora cubensis*) infection on wild type and A349T mutant *Cucumis melo* plants (Vedrantais melon).
Figure 2B:
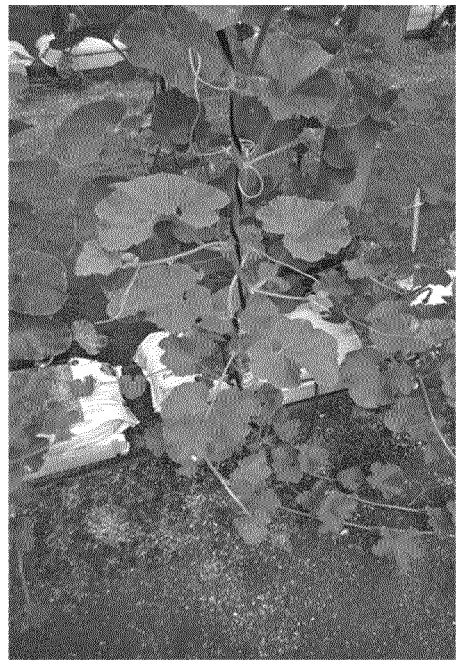

The results of the downy mildew assay are shown in Table 2. The homozygous A349T plants were consistently resistant (score of about 8) across all four weeks of testing. In contrast, the heterozygous A349T plants were susceptible, and showed similar results to the WT plants across all four weeks of testing. FIGS. 2A-2B show representative images of WT and homozygous A349T mutant plants during testing. These results indicate that the A349T mutation is preferably present homozygously in order to provide downy mildew resistance.

TABLE 2

| | Downy mildew assay results | | | |
|---|---|---|---|---|
| | Downy mildew disease score | | | |
| Genotype | Week 1 | Week 2 | Week 3 | Week 4 |
| A349T (HO) | 8.0 | 7.8 | 8.0 | 8.0 |
| A349T (HE) | 5.0 | 3.9 | 3.1 | 2.1 |
| WT | 5.3 | 4.0 | 3.3 | 2.0 |

Example 3: Powdery Mildew (*Podosphaera xanthii*) Infection Assay

Wild type and A349T mutant melon (*Cucumis melo*) plants (Vedrantais melon) were infected with powdery mildew (*Podosphaera xanthii*). Infection with *Podosphaera xanthii* was done when the plants had 5-8 leaves.

The first disease scoring was done 24 to 31 days after infection on a wild type (WT) plant, a mutant plant. Table 3 provides a detailed description of the disease scoring scale used in the powdery mildew infection assay. Briefly, disease scoring was performed on the scale of 1 to 8, where a score of 1 meant plants were fully susceptible and showed necrosis while a score of 8 meant plants were fully resistant and showed no symptoms of infection.

TABLE 3

| | Powdery mildew assay scoring scale | |
|---|---|---|
| Score | Lower surface of leaf phenotype | Upper surface of leaf phenotype |
| 1 | Heavy sporulation | Completely white sporulation with dry areas |
| 2 | Heavy sporulation | White sporulation that cover more than 85% of the surface |
| 3 | Heavy sporulation | White sporulation that cover more than 75% of the surface |
| 4 | Heavy sporulation | White sporulation that cover more than 50% of the surface |
| 5 | Sporulation | White sporulation that cover 30-50% of the surface |
| 6 | Slight sporulation | White sporulation that cover 10-30% of the surface |
| 7 | No sporulation | White sporulation that cover less than 10% of the surface |
| 8 | No symptoms | No symptoms |

Figures 5A, 5B:
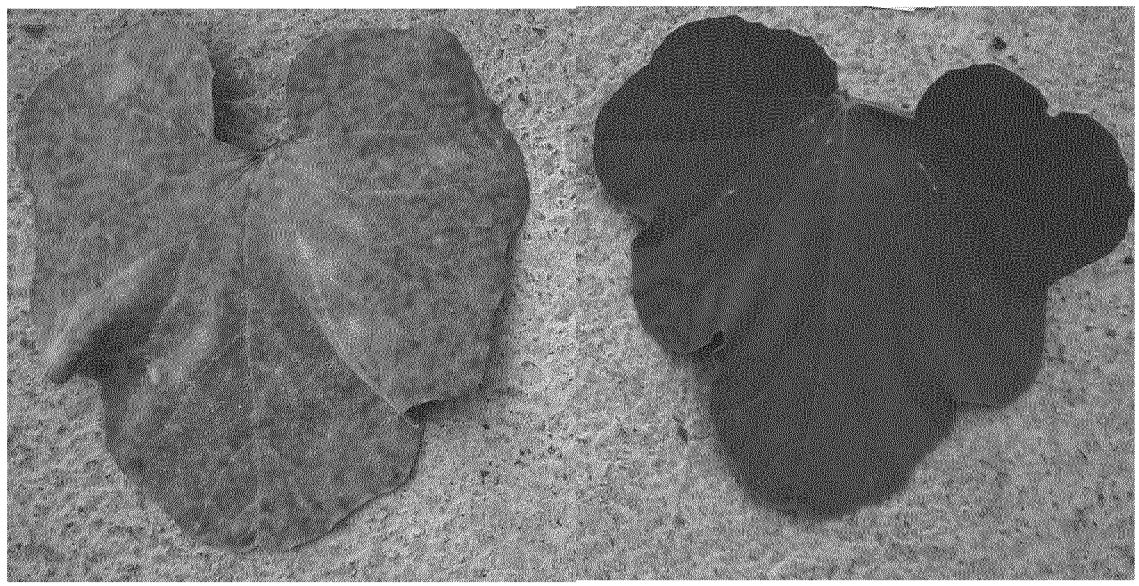
FIGS. 5A-5B show representative images of powdery mildew (*Podosphaera xanthii*) infection on wild type and A349T mutant *Cucumis melo* plants (Vedrantais melon).
Figure 6A:
FIG. 6A-6B show representative images of the melon fruit of the wild type (FIG. 6A) and the A349T mutant *Cucumis melo* plants (FIG. 6B). The melon plant of present invention showed normal fruit set, ripening and fruit development, producing fruits that are suitable for commercial use. Fruits of the wild type and mutant plants were of comparable fruit quality having similar brix levels, firmness and shape.
Figure 6B:
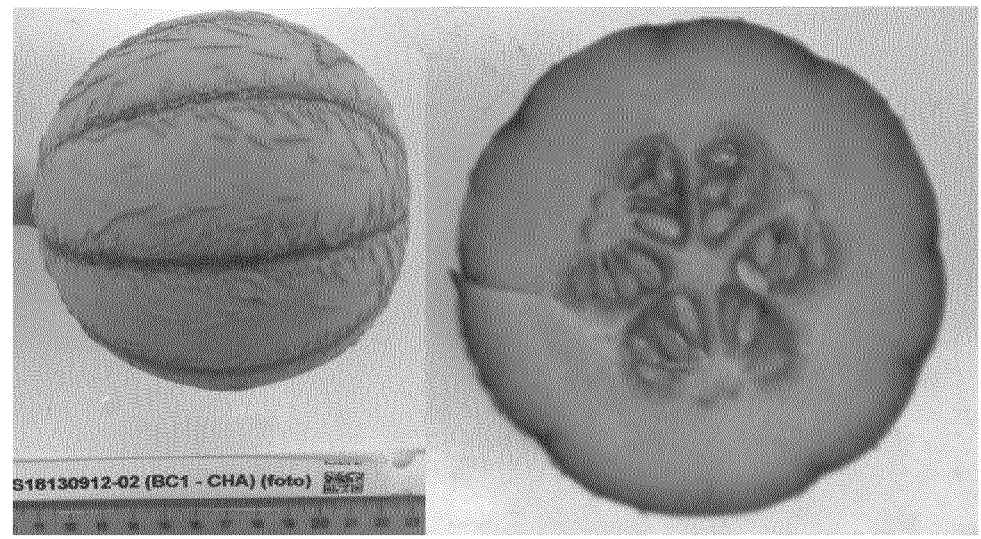

The results of the powdery mildew assay are shown in Table 4. The mutant A349T plants were fully resistant (score of 8). In contrast, the WT plants were fully susceptible. FIGS. 5A-5B show representative images of WT and A349T mutant plants during testing. These results indicate that the A349T mutation in the DMR1 gene provides powdery mildew resistance.

TABLE 4

| Downy mildew assay results | |
|---|---|
| Genotype | Downy mildew disease score |
| A349T | 8.0 (FIG. 5B) |
| WT | 1.0 (FIG. 5A) |

The invention claimed is:

1. A downy mildew resistant melon plant, wherein a genome of said melon plant comprises a homoserine kinase gene expressing a mutated homoserine kinase protein, wherein the mutated homoserine kinase protein comprises an amino acid substitution of an amino acid alanine (A) to an amino acid threonine (T) at position 349 of a homoserine kinase protein having the amino acid sequence set forth in SEQ ID NO: 1.

2. The downy mildew resistant melon plant according to claim 1, wherein said melon plant is furthermore resistant to powdery mildew.

3. The downy mildew resistant melon plant according to claim 1, wherein said homoserine kinase gene is homozygously present in the genome of said melon plant.

4. The downy mildew resistant melon plant according to claim 1, wherein the amino acid sequence of the mutated homoserine kinase protein is set forth in SEQ ID NO: 3.

5. The downy mildew resistant melon plant according to claim 1, wherein the homoserine kinase gene encodes a mutated cDNA, wherein the mutated cDNA comprises a nucleotide change of guanine to adenine at position 1045 of SEQ ID NO: 2.

6. The downy mildew resistant melon plant according to claim 5, wherein the nucleotide sequence of the mutated cDNA is set forth in SEQ ID NO: 4.

7. The downy mildew resistant melon plant according to claim 1, wherein the melon plant is resistant to a downy mildew caused by *Pseudoperonospora cubensis.*

8. The downy mildew resistant melon plant according to claim 2, wherein the powdery mildew is caused by *Podosphaera xanthii* and/or *Golovinomyces cicharacearum.*

9. The downy mildew resistant melon plant according to claim 1, wherein the mutation of the mutated homoserine kinase protein provides an in planta homoserine concentration of 200 to 1000 ng/mg fresh weight in leaves of said melon plant.

10. The downy mildew resistant melon plant according to claim 1, wherein the mutation of the mutated homoserine kinase protein provides an in planta homoserine concentration of 300 to 700 ng/mg fresh in leaves of the melon plant.

11. A seed, cell or plant part of the melon plant according to claim 1.

12. A mutated homoserine kinase protein, wherein a mutation of the mutated homoserine kinase protein comprises an amino acid substitution of an amino acid alanine (A) to an amino acid threonine (T) at position 349 of a homoserine kinase protein having the amino acid sequence set forth in SEQ ID NO: 1.

13. The mutated homoserine kinase protein according to claim 12, wherein the amino acid sequence of the mutated homoserine kinase protein is set forth in SEQ ID NO: 3.

14. A cDNA capable of being translated into the mutated homoserine kinase protein of claim 12.

15. A homoserine kinase gene capable of expressing the mutated homoserine kinase protein of claim 12.

16. A method for identifying a mildew resistant melon plant, wherein said method comprises the step of establishing a presence of the mutated homoserine kinase protein of claim 12 in said melon plant.

17. The method according to claim 16, wherein the step of establishing the presence of the mutated homoserine kinase protein in the melon plant comprises establishing a presence of SEQ ID NO: 3 or SEQ ID NO: 4 in said melon plant.

18. A method of providing a downy mildew resistant melon plant, comprising using the homoserine kinase gene according to claim 15, or the cDNA sequence thereof, to provide the melon plant having a resistance or an increased resistance to downy mildew.

19. A homoserine kinase gene capable of being transcribed into the cDNA of claim 14.

20. A method for identifying a mildew resistant melon plant, wherein said method comprises the step of establishing a presence of the cDNA of claim 14.

* * * * *

SEQUENCE LISTING

```
<160> NUMBER OF SEQ ID NOS: 4

<210> SEQ ID NO 1
<211> LENGTH: 373
<212> TYPE: PRT
<213> ORGANISM: Cucumis melo
<220> FEATURE:
<223> OTHER INFORMATION: DMR1 wt

<400> SEQUENCE: 1

Met Ala Met Ile Ser Tyr Gln Pro Pro Leu Lys Ser Leu Thr Ile Pro
1               5                   10                  15

Pro Val Ser Leu Ser Asn Pro Lys Pro Val Leu Phe Arg Cys Ser Leu
                20                  25                  30

Ser Leu Pro Ser Arg Ala Ala Val Thr Ser Val Glu Pro Gln Pro Val
            35                  40                  45

Phe Ser Ser Val Lys Ala Phe Ala Pro Ala Thr Val Ala Asn Leu Gly
        50                  55                  60

Pro Gly Phe Asp Phe Leu Gly Cys Ala Val Asp Gly Leu Gly Asp Tyr
65                  70                  75                  80

Val Ser Leu Ser Val Asp Ser Asn Val His Pro Gly Glu Val Ala Ile
                85                  90                  95

Ser Asp Ile Thr Gly Asn Asn Thr Asn Lys Leu Ser Lys Asn Pro Leu
                100                 105                 110
```

Tyr Asn Cys Ala Gly Ile Ala Ala Ile Glu Val Met Lys Met Leu Gly
            115                 120                 125

Ile Arg Ser Val Gly Leu Ser Leu Ser Leu Glu Lys Gly Leu Pro Leu
    130                 135                 140

Gly Ser Gly Leu Gly Ser Ser Ala Ala Ser Ala Ala Ala Ala Ala Ile
145                 150                 155                 160

Ala Val Asn Gly Leu Phe Gly Gly Lys Leu Gly Val Glu Glu Leu Val
                165                 170                 175

Leu Ala Gly Leu Lys Ser Glu Glu Lys Val Ser Gly Tyr His Ala Asp
            180                 185                 190

Asn Val Ala Pro Ala Ile Met Gly Gly Phe Ile Leu Ile Arg Asn Tyr
        195                 200                 205

Glu Pro Leu Glu Leu Ile Arg Leu Lys Phe Pro Val Asp Lys Glu Leu
    210                 215                 220

Phe Phe Val Leu Val Ser Pro Glu Phe Glu Ala Pro Thr Lys Lys Met
225                 230                 235                 240

Arg Ala Ala Leu Pro Ala Glu Val Gly Met Pro His His Val Trp Asn
                245                 250                 255

Ser Ser Gln Ala Gly Ala Leu Val Ala Ala Val Leu Gln Gly Asp Thr
            260                 265                 270

Met Gly Leu Gly Lys Ala Leu Ser Ser Asp Lys Ile Val Glu Pro Arg
        275                 280                 285

Arg Ser Pro Leu Ile Pro Gly Met Asp Gly Val Lys Lys Ala Ala Ile
    290                 295                 300

Ala Ala Gly Ala Phe Gly Cys Thr Ile Ser Ala Gly Pro Thr Ala
305                 310                 315                 320

Val Ala Val Ile Asp Asn Glu Glu Gln Gly Lys Glu Ile Gly Glu Arg
                325                 330                 335

Met Val Met Ala Phe Leu Lys Glu Gly Asn Leu Lys Ala Ala Ala Ser
            340                 345                 350

Val Lys Arg Leu Asp Arg Val Gly Ala Arg Leu Ile Gly Ser Thr Pro
        355                 360                 365

Leu Asp Arg Val Leu
    370

<210> SEQ ID NO 2
<211> LENGTH: 1122
<212> TYPE: DNA
<213> ORGANISM: Cucumis melo
<220> FEATURE:
<223> OTHER INFORMATION: DMR1 wt

<400> SEQUENCE: 2
atggctatga tctcctatca accgccattg aagtcgttga ccattcctcc agtttcttta      60
tctaaccctn aacctgttct cttcaggtgc agtttgtctc ttccatctag agccgccgtc     120
acctcggtcg aacctcaacc ggttttctcc tccgtcaagg cctttgctcc tgcaaccgtc     180
gctaatttag gccccggctt tgatttcctt ggctgcgctg ttgatggctt gggagattat     240
gtctctctta gtgttgattc caatgttcat ccaggtgaag ttgcgatttc tgatattaca     300
gggaacaaca cgaataaact agtaaaaat cctctctata attgtgctgg tattgctgct      360
attgaggtta tgaaaatgct agggattcga tctgttggtc tttctctttc gcttgagaaa     420
ggtttgccgt tagggagtgg attgggatct agtgctgcga gtgcagctgc tgctgcgatt    480
gctgttaatg gattgttcgg tggaaaatta ggagtagagg aattggttct cgcggggttg    540

```
aaatcggaag agaaggtttc tggatatcat gcggataatg tcgcaccggc tatcatgggg    600
ggtttcattc tgattcgaaa ttacgaaccc ttggaattga ttcgtttgaa attccccgtc    660
gataaggagc tgttcttcgt gttggtcagc ccggaattcg aagcaccgac gaagaaaatg    720
cgggctgcgt tacctgctga agttgggatg ccacaccatg tgtggaattc cagccaagcc    780
ggggcgttgg tggccgcggt gctgcagggc gacacgatgg gattggggaa agcattgtcc    840
tcagacaaaa ttgtggagcc aaggcgttcc ccattaattc caggtatgga tggtgttaag    900
aaggcagcca ttgctgctgg ggcatttggg tgcacgataa gtggagcagg gccaacggcg    960
gtggcagtga tcgataacga agagcagggg aaggagattg tgagaggat ggttatggcc    1020 tttctgaagg aaggaaattt gaaagctgcg gcatctgtaa agagactaga tcgagttggt    1080
gcaaggctta ttggatcaac tcctttagat agagttttat ga                       1122
```

```
<210> SEQ ID NO 3
<211> LENGTH: 373
<212> TYPE: PRT
<213> ORGANISM: Cucumis melo
<220> FEATURE:
<223> OTHER INFORMATION: mutant DMR1

<400> SEQUENCE: 3

Met Ala Met Ile Ser Tyr Gln Pro Pro Leu Lys Ser Leu Thr Ile Pro
1               5                   10                  15

Pro Val Ser Leu Ser Asn Pro Lys Pro Val Leu Phe Arg Cys Ser Leu
                20                  25                  30

Ser Leu Pro Ser Arg Ala Ala Val Thr Ser Val Glu Pro Gln Pro Val
            35                  40                  45

Phe Ser Val Lys Ala Phe Ala Pro Ala Thr Val Ala Asn Leu Gly
        50                  55                  60

Pro Gly Phe Asp Phe Leu Gly Cys Ala Val Asp Gly Leu Gly Asp Tyr
65                  70                  75                  80

Val Ser Leu Ser Val Asp Ser Asn Val His Pro Gly Glu Val Ala Ile
                85                  90                  95

Ser Asp Ile Thr Gly Asn Asn Thr Asn Lys Leu Ser Lys Asn Pro Leu
            100                 105                 110

Tyr Asn Cys Ala Gly Ile Ala Ala Ile Glu Val Met Lys Met Leu Gly
        115                 120                 125

Ile Arg Ser Val Gly Leu Ser Leu Ser Leu Glu Lys Gly Leu Pro Leu
    130                 135                 140

Gly Ser Gly Leu Gly Ser Ser Ala Ala Ser Ala Ala Ala Ala Ala Ile
145                 150                 155                 160

Ala Val Asn Gly Leu Phe Gly Gly Lys Leu Gly Val Glu Glu Leu Val
                165                 170                 175

Leu Ala Gly Leu Lys Ser Glu Glu Lys Val Ser Gly Tyr His Ala Asp
            180                 185                 190

Asn Val Ala Pro Ala Ile Met Gly Gly Phe Ile Leu Ile Arg Asn Tyr
        195                 200                 205

Glu Pro Leu Glu Leu Ile Arg Leu Lys Phe Pro Val Asp Lys Glu Leu
    210                 215                 220

Phe Phe Val Leu Val Ser Pro Glu Phe Glu Ala Pro Thr Lys Lys Met
225                 230                 235                 240

Arg Ala Ala Leu Pro Ala Glu Val Gly Met Pro His His Val Trp Asn
                245                 250                 255
```

```
Ser Ser Gln Ala Gly Ala Leu Val Ala Ala Val Leu Gln Gly Asp Thr
            260                 265                 270

Met Gly Leu Gly Lys Ala Leu Ser Ser Asp Lys Ile Val Glu Pro Arg
        275                 280                 285

Arg Ser Pro Leu Ile Pro Gly Met Asp Gly Val Lys Lys Ala Ala Ile
        290                 295                 300

Ala Ala Gly Ala Phe Gly Cys Thr Ile Ser Gly Ala Gly Pro Thr Ala
305                 310                 315                 320

Val Ala Val Ile Asp Asn Glu Glu Gln Gly Lys Glu Ile Gly Glu Arg
                325                 330                 335

Met Val Met Ala Phe Leu Lys Glu Gly Asn Leu Lys Thr Ala Ala Ser
            340                 345                 350

Val Lys Arg Leu Asp Arg Val Gly Ala Arg Leu Ile Gly Ser Thr Pro
        355                 360                 365

Leu Asp Arg Val Leu
    370

<210> SEQ ID NO 4
<211> LENGTH: 1122
<212> TYPE: DNA
<213> ORGANISM: Cucumis melo
<220> FEATURE:
<223> OTHER INFORMATION: mutant DMR1

<400> SEQUENCE: 4
atggctatga tctcctatca accgccattg aagtcgttga ccattcctcc agtttcttta    60
tctaacccta aacctgttct cttcaggtgc agtttgtctc ttccatctag agccgccgtc   120
acctcggtcg aacctcaacc ggttttctcc tccgtcaagg cctttgctcc tgcaaccgtc   180
gctaatttag gccccggctt tgatttcctt ggctgcgctg ttgatggctt gggagattat   240
gtctctctta gtgttgattc caatgttcat ccaggtgaag ttgcgatttc tgatattaca   300
gggaacaaca cgaataaact tagtaaaaat cctctctata attgtgctgg tattgctgct   360
attgaggtta tgaaaatgct agggattcga tctgttggtc tttctctttc gcttgagaaa   420
ggtttgccgt tagggagtgg attgggatct agtgctgcga gtgcagctgc tgctgcgatt   480
gctgttaatg gattgttcgg tgggaaatta ggagtagagg aattggttct cgcggggttg   540
aaatcggaag agaaggtttc tggatatcat gcggataatg tcgcaccggc tatcatgggg   600
ggtttcattc tgattcgaaa ttacgaaccc ttggaattga ttcgtttgaa attccccgtc   660
gataaggagc tgttcttcgt gttggtcagc ccggaattcg aagcaccgac gaagaaaatg   720
cgggctgcgt tacctgctga agttgggatg ccacaccatg tgtggaattc cagccaagcc   780
ggggcgttgg tggccgcggt gctgcagggc gacacgatgg gattggggaa agcattgtcc   840
tcagacaaaa ttgtggagcc aaggcgttcc ccattaattc caggtatgga tggtgttaag   900
aaggcagcca ttgctgctgg ggcatttggg tgcacgataa gtggagcagg gccaacggcg   960
gtggcagtga tcgataacga agagcagggg aaggagattg tgagaggat ggttatggcg    1020
tttctgaagg aaggaaattt gaaaactgcg gcatctgtaa agagactaga tcgagttggt  1080
gcaaggctta ttggatcaac tcctttagat agagtttat ga                     1122
```